3,240,747
PROCESS FOR IMPROVING POLYMER COMPOSITIONS
Richard F. Heitmiller, Wellesley, and Robert W. Cottingham, Stoneham, Mass., assignors to Cabot Corporation, Boston, Mass., a corporation of Delaware
No Drawing. Filed Mar. 8, 1963, Ser. No. 263,687
14 Claims. (Cl. 260—45.7)

This invention relates to a novel process for the stabilization of the color and odor of thermoplastic polymers.

The polymerization or copolymerization of monomers such as mono- and di-olefins, vinyl ethers, vinyl esters, acetals, halogenated mono- and di-olefins and the like to high molecular weight products by contacting the monomer(s) with a two component catalyst system comprising (a) an inorganic solid bearing chemically combined on the surface thereof structures such as

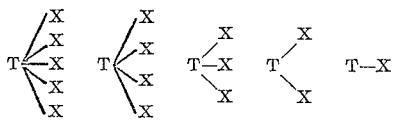

wherein T is a metal of Groups IVa, Va, VIa, VIIa or VIII (where group numbers correspond to the Mendeleev Periodic System), and each X is a halide, and (b) an organometallic compound such as aluminum triisobutyl or triethylsilane, has been amply disclosed, for example, in copending U.S. applications 2,861, filed January 18, 1960, and 15,815, filed March 18, 1960, both by Orzechowski and MacKenzie, and both now abandoned. Said processes can be performed as batch or continuous polymization operations after which the catalyst is normally deactivated with water, alcohol or aqueous or alcoholic solutions of inorganic acids at elevated temperatures. The difficulty in effectively controlling the color and odor properties of the polymers so produced has heretofore been a nuisance. In accordance with the present invention, however, this problem has been greatly alleviated.

Accordingly, it is a principal object of the present invention to provide improved polymer compositions.

It is a further object of the present invention to provide polymer compositions of improved color and odor stability.

Another object of the present invention is to provide a process for producing polymer compositions having improved color and odor.

Other objects of the present invention will in part be obvious and will in part appear hereinafter.

In accordance with the present invention it has been discovered that the addition of certain organophosphorous compounds to the catalyst or catalyst components prior to polymerization, or introduction of said compounds into the polymerization zone during polymerization produces an unexpected improvement in the color and odor, and in the stability thereof, of the polymer compositions produced.

Organophosphorous compounds suitable for use in the practice of the present invention are generally those compounds chosen from the group conforming to the general empirical formula:

wherein R is any radical chosen from the group consisting of hydrocarbons having a length of up to about 18 carbon atoms and hydrogen; P is phosphorus; O is oxygen; H is hydrogen; and wherein A is any functional group chosen from the group consisting of hydroxyl (—OH); alkoxy and aryloxy (—OR); metallate radicals (—OMe, wherein Me is chosen from the group consisting of the metals of Groups I, II, and III); amino (—NH$_2$); mono- and di-N-substituted amino (—NHR, —NR$_2$); hydroxylamino (—ONH$_2$); and mono- and di-N-substituted hydroxylamino (—ONHR, —ONR$_2$); wherein each R is any hydrocarbon radical having a length of up to about 18 carbon atoms.

Specific examples of organophosphorous compounds which conform to said general formula and are therefore suitable for use in the practice of the present invention are: phenylphosphinic acid=(C$_6$H$_5$)HPOOH; isopropylphosphinic acid=(C$_3$H$_7$)HPOOH; ethyl tolylphosphinates=(CH$_3$C$_6$H$_4$)HPOOC$_2$H$_5$; benzyl ethylphosphinate =(C$_2$H$_5$)HPOOCH$_2$C$_6$H$_5$; N - hexyl phenylphosphinamides=(C$_6$H$_5$)HPONHC$_6$H$_{13}$; N,N - dibutyl ethylphosphinamides=(C$_2$H$_6$)HPON(C$_4$H$_9$)$_2$; sodium α-naphthylphosphinate=(α-C$_{10}$H$_7$)HPOONa; aluminum ethylphosphinate =[(C$_2$H$_5$)HPOO]$_3$Al; sodium hypophosphite =H$_2$POONa; hypophosphorous acid=H$_2$POOH; and the like.

The manner in which said organophosphorous compounds are introduced into the polymerization zone is subject to considerable variation. Thus, said compounds can be introduced with one of the catalyst components or with the premixed catalyst or at any time during the polymerization. However, it should be noted that catalysts and catalyst components of the type described above are generally extremely reactive towards moisture which acts as a "poison" to the catalyst system. Thus, it is necessary, in order to obtain optimum and reproducible results, that the organophosphorous compounds of the present invention be dried in such a manner as to render said compounds substantially free from moisture prior to use. There are, of course, many means by which said drying can be effected, such as by distillation and heating under vacuum.

It has been found that the beneficial effects of the present invention accrue when said organophosphorous compound is utilized in quantities sufficient to provide between about .35 milliatom and about 70 milliatoms of phosphorous per 1000 grams of dry polymer produced. Also, it is generally found that within the above range, the greater the amount of organophosphorous compound utilized, all other conditions being constant, the greater the benefits of enhanced color and odor stability that accrue. However, the introduction of organophosphorous compound in quantities representing a concentration of phosphorous above about 55 milliatoms per 1000 grams of the polymer composition further increases color and odor stability only to a minor extent; hence, the use of organophosphorous compounds at levels sufficient to provide phosphorous concentrations between about 0.7 milliatom and about 55 milliatoms per 1000 grams of the total polymer formulation produced is preferred.

The manner in which the catalyst components are produced are now well known and need not be elaborated upon here. Also, the ratio of the cocatalyst components to each other and/or the ratio of the completed two-component catalyst to the monomer polymerized and/or the particular monomer polymerized are not critical features of the present invention.

The manner in which the polymerization procedure is accomplished is likewise not normally critical. Thus, temperatures between about 0° C. and about 150° C. and atmospheric pressures or higher are generally ideal provided, of course, that the temperatures utilized are not above the decomposition temperature of the organophosphorous compound. Thus, in general, it is sufficient to say, that the present invention is applicable to the stabilization of the color and odor of many polymeric materials, but particularly of polymers of α-monoolefinic hydrocarbons such as ethylene, propylene and butene-1.

There follow a number of non-limiting examples:

*Example 1*

To a 1000 milliliter, three neck, glass reaction vessel there is added 10 grams of "Cab-O-Sil," a pyrogenic silica produced by Cabot Corporation, which has an average particle diameter of 10 millimicrons and a hydroxyl group content on the surface thereof of about 1.5 milliequivalents per gram.

Said reaction vessel is then placed in a vacuum drying oven heated to a temperature of about 150° C. for about 20 hours. Subsequently, the vessel is sealed without exposing the silica contained therein to the atmosphere and there are charged to said vessel about 500 milliliters of anhydrous isooctane and 10 millimoles of titanium tetrachloride. The vessel is then continuously stirred, and maintained at a temperature of about 105° C. for a period of about 4 hours. Subsequently, the extent of the reaction between the titanium tetrachloride and hydroxyl groups on the surface of the silica is determined by measuring the quantity of HCl removed from the vessel by the nitrogen stream, and by testing the liquid contents of the vessel for the absence therein of titanium tetrachloride and said silica is found to have 10 milliatoms of titanium chemically bound to the surface thereof. Two 100 milliliter aliquots of said slurry each containing about 2 milliatoms of titanium chemically bound to about 2 grams of silica are each introduced to a one gallon stainless steel stirred autoclave (autoclave 1 and autoclave 2) which had been previously flushed with dry nitrogen. Thereafter, there is introduced into each autoclave about 1500 milliliters anhydrous isooctane, and about 2 millimoles triisobutylaluminum. In addition, there is introduced into autoclave 2 about 0.50 gram of phenylphosphinic acid. Each of said autoclaves is then heated to, and maintained at, about 80° C. with vigorous agitation while there is introduced thereinto a gaseous mixture comprising about 50% ethylene and about 50% hydrogen to a total pressure of about 200 p.s.i.g. which pressure is thereafter maintained by the periodic introduction thereinto as needed of further amounts of said mixture. After about one hour, the reaction is discontinued and there is introduced into each autoclave about 15 milliliters of 2-propanol. After cooling to ambient temperature, agitation is arrested and the solid products of reaction from each autoclave are removed and filtered. It is found that the polymer product from autoclave 2 contains about 17.7 milliatoms of phosphorous/1000 grams of polymer.

Next, a film of about 0.020 inch thickness is pressed from the product recovered from each of said autoclaves by placing about 2 grams of the dried polymer from each autoclave between two polished 0.040 inch thick aluminum sheets equipped with a 0.020 inch spacer, and which are in turn placed between the platens of a Carver Laboratory Press previously heated to about 150° C. A ram pressure of about 5 tons is then applied to the platens of said press for about one minute after which the aluminum sheets, containing each sample therein, are withdrawn and allowed to cool to ambient temperature. The films are then subjected to color analysis by means of a Color Eye Model S-48, said instrument manufactured by Instrument Development Laboratories, Attleboro, Mass. The film formed from the polymer product of autoclave 1 had a color value of 86.2 whereas the film formed from the polymer product of autoclave 2 had a color value of 95. The 95 value constitutes a substantial and an economically important improvement over the 86.2 value.

*Example 2*

To 100 grams of the polymer product produced from autoclave 1 which had been placed in a wide-neck jar, there is added about 0.25 gram of phenylphosphinic acid. Next, one pint demineralized water is added and said jar is agitated on a paint shaker for about 15 minutes at 180 c.p.m. The slurry is then filtered through a sintered glass funnel and the solid polymer collected therein is further washed with one pint demineralized water and finally dried as in Example 1. Next, a film is pressed from the resulting polymer and color analysis effected according to the procedure as set forth in Example 1. The color value of film was about 89.

Obviously, many changes can be made in the above-described examples and procedure without departing from the scope of the invention. For instance, although only phenyl-phosphinic acid is specifically mentioned in the above examples, other compounds within the scope of the general formula set forth above, such as sodium α-naphthylphosphinate and benzyl ethylphosphinate are also entirely suitable.

Also, other organometallic compounds as disclosed in copending U.S. applications 2,861 and 15,815, both now abandoned, are entirely suitable in the practice of the present invention; for instance, octylmagnesium hydride. Moreover, organometallic compounds as disclosed in copending U.S. application 209,232, filed July 11, 1962, by Orzechowski and Mackenzie, now abandoned, such as diethoxysilane and triphensylsilane are also suitable.

Accordingly, it is intended that the above disclosure be regarded as illustrative and as in no way limiting the scope of the invention.

What we claim is:

1. In the process of polymerizing a substance chosen from the group consisting of a mono-olefin, monoolefins, a di-olefin, di-olefins and mixtures thereof with a catalyst system comprising
  (a) an inorganic solid bearing chemically combined on the surface thereof structures such as

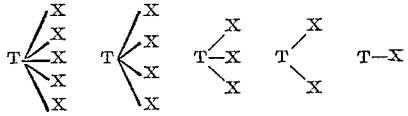

wherein T is chosen from the group consisting of the metals of Groups IVa, Va, VIa, VIIa and VIII; and each X is any halide; and wherein T is chemically bound to an oxygen atom in the surface of said inorganic solid, and
  (b) an organometallic compound,
the improvement which comprises conducting the polymerization in the presence of an organophosphorous compound conforming to the general empirical formula:

wherein R is chosen from the group consisting of any hydrocarbon radical having a length of up to about 18 carbon atoms and hydrogen; P is phosphorus; O is oxygen; H is hydrogen; and wherein A is any functional group chosen from the group consisting of hydroxyl (-OH); metallate radicals (-OMe, wherein Me is chosen from the group consisting of the metals of Groups I, II, and III); alkoxy and aryloxy (—OR); amino (—NH$_2$); mono- and di- substituted amino (—NHR, —NR$_2$); hydroxyamino (—ONH$_2$); and mono- and di-N-substituted hydroxylamino (—ONHR, —ONR$_2$); wherein each R is any hydro-carbon radical having a length of up to about 18 carbon atoms.

2. The process of claim 1 wherein the substance polymerized is chosen from the group consisting of ethylene, propylene, and butene-1.

3. The process of claim 1 wherein the substance polymerized is ethylene.

4. The process of claim 1 wherein the concentration of said organophosphorous compound utilized is between about 0.35 milliatom and about 70 milliatoms phosphorus/1000 grams of the polymer product.

5. The process of claim 1 wherein the concentration of said organophosphorous compound utilized is between about 0.7 milliatom phosphorus and about 55 milliatoms phosphorus/1000 grams of the polymer product.

6. The process of claim 1 wherein said compound conforming to said formula

is an alkyl phosphinic acid.

7. The process of claim 1 wherein said compound conforming to said formula

is an aryl phosphinic acid.

8. The process of claim 1 wherein said compound conforming to said formula

is a metal salt of an alkyl phosphinic acid.

9. The process of claim 1 wherein said compound conforming to said formula

is phenylphosphinic acid.

10. Polyethylene containing dispersed therein between about 0.35 milliatom and about 70 milliatoms phosphorus/1000 grams of the total of an organophosphorous compound conforming to the general empirical formula:

wherein R is chosen from the group consisting of any hydrocarbon radical having a length of up to about 18 carbon atoms and hydrogen; P is phosphorus; O is oxygen; H is hydrogen; and wherein A is any functional group chosen from the group consisting of hydroxyl (—OH); metallate radicals (—OMe, wherein Me is chosen from the group consisting of the metals of Groups I, II, and III); alkoxy and aryloxy (—OR); amino (—NH$_2$); mono- and di-substituted amino (—NHR, —NR$_2$); hydroxylamino (—ONH$_2$); and mono- and di-N-substituted hydroxylamino (—ONHR, ONR$_2$); wherein each R is any hydrocarbon radical having a length of up to about 18 carbon atoms.

11. The polyethylene of claim 10 wherein the concentration of said organophosphorous compound is between about 0.7 milliatom and about 55 milliatoms phosphorus/1000 grams of the total.

12. The polyethylene of claim 10 wherein said organophosphorous compound is an alkyl phosphinic acid.

13. The polyethylene of claim 10 wherein said organophosphorous compound is phenylphosphinic acid.

14. The polyethylene of claim 10 wherein said organophosphorous compound is a Group I metal salt of phenylphosphinic acid.

No references cited.

JOSEPH L. SCHAFER, *Primary Examiner.*

LAWRENCE EDELMAN, *Assistant Examiner.*